United States Patent
Saida et al.

(10) Patent No.: US 8,945,240 B2
(45) Date of Patent: Feb. 3, 2015

(54) SOLID ELECTROLYTIC CAPACITOR AND METHOD FOR PRODUCING SOLID ELECTROLYTIC CAPACITOR

(71) Applicant: Murata Manufacturing Co., Ltd., Nagaokakyo (JP)

(72) Inventors: Yoshihiro Saida, Nagaokakyo (JP); Masaaki Nishioka, Nagaokakyo (JP)

(73) Assignee: Murato Manufacturing Co., Ltd., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 14/098,919

(22) Filed: Dec. 6, 2013

(65) Prior Publication Data

US 2014/0090221 A1 Apr. 3, 2014

Related U.S. Application Data

(62) Division of application No. 12/873,533, filed on Sep. 1, 2010, now Pat. No. 8,630,084.

(30) Foreign Application Priority Data

Dec. 22, 2009 (JP) .................................. 2009-291377

(51) Int. Cl.
*H01G 9/00* (2006.01)
*H01G 9/052* (2006.01)
*H01G 9/012* (2006.01)
*H01G 9/15* (2006.01)

(52) U.S. Cl.
CPC ............. *H01G 9/0032* (2013.01); *H01G 9/052* (2013.01); *H01G 9/012* (2013.01); *H01G 9/15* (2013.01)

USPC ......................................................... 29/25.03

(58) Field of Classification Search
None
See application file for complete search history.

(56) References Cited

U.S. PATENT DOCUMENTS

| | | | |
|---|---|---|---|
| 5,584,890 A | 12/1996 | MacFarlane et al. | |
| 6,464,739 B2 | 10/2002 | Yoshida et al. | |
| 6,563,693 B2 | 5/2003 | Nakada et al. | |
| 6,775,127 B2 | 8/2004 | Yoshida | |
| 8,630,084 B2 * | 1/2014 | Saida et al. .................. | 361/528 |
| 2005/0270725 A1 | 12/2005 | Hahn et al. | |
| 2006/0152883 A1 | 7/2006 | Konuma et al. | |

FOREIGN PATENT DOCUMENTS

| | | |
|---|---|---|
| CN | 101233591 A | 7/2008 |
| JP | S59-108311 A | 6/1984 |

(Continued)

OTHER PUBLICATIONS

China Office Action, issued for corresponding application CH 201010261244.7, issued May 14, 2012 (English translation of cover page).

(Continued)

*Primary Examiner* — Seahvosh Nikmanesh
(74) *Attorney, Agent, or Firm* — Dickstein Shapiro LLP

(57) ABSTRACT

A solid electrolytic capacitor element having a solid electrolyte layer provided on a dielectric layer formed on a surface of an anode body comprising a valve acting metal including a pore, wherein the anode body is configured in such a way that multiple plate-shaped anode bodies are directly piled and integrated with a solid electrolyte, and adjacent piled anode bodies are joined at a section thereof, and a method for producing the solid electrolytic capacitor element.

5 Claims, 3 Drawing Sheets

(56) References Cited

FOREIGN PATENT DOCUMENTS

| | | |
|---|---|---|
| JP | 38313 | 1/1991 |
| JP | 04-091418 A | 3/1992 |
| JP | 5304059 A | 11/1993 |
| JP | 2000-348983 A | 12/2000 |
| JP | 2001-230156 A | 8/2001 |
| JP | 2001-307957 A | 11/2001 |
| JP | 2003-332173 A | 11/2003 |
| JP | 2006-173593 A | 6/2006 |
| JP | 2008-066430 A | 3/2008 |
| JP | 2008-078312 A | 4/2008 |
| TW | 459255 B | 10/2001 |
| WO | WO-2006/123451 | 11/2006 |

OTHER PUBLICATIONS

Taiwan Office Action issued for corresponding patent application 099126810, data of mailing Jun. 24, 2013 (with English translation).
Japanese Office Action issued for Japanese Application No. JP 2010-212976, date of dispatch.

* cited by examiner

SOLID ELECTROLYTIC CAPACITOR AND METHOD FOR PRODUCING SOLID ELECTROLYTIC CAPACITOR

CROSS REFERENCE TO RELATED APPLICATIONS

The present application is a divisional of application Ser. No. 12/873,533, filed Sep. 1, 2010, now U.S. Pat. No. 8,630,084, the entire contents of which are incorporated herein by reference.

BACKGROUND OF THE INVENTION

1. Field of the Invention

The present invention relates to a solid electrolytic capacitor using a conductive polymer as a solid electrolyte layer, and a method for producing the solid electrolytic capacitor. More specifically, the present invention relates to a solid electrolytic capacitor which has a high capacitance per unit volume, and a method for producing the solid electrolytic capacitor.

2. Description of the Related Art

Solid electrolytic capacitors are configured typically in such a way that the surface of an anode body composed of a valve acting metal such as aluminum, tantalum, niobium, titanium, and alloys thereof is roughened by etching to form micropores on the order of microns and thus increase the surface area, a dielectric oxide film (hereinafter, which may be simply referred to as a dielectric film) is formed thereon by a chemical conversion step, a cathode section is further impregnated with a solid electrolyte with a separator composed of an insulating resin interposed between the cathode section and an anode section, a cathode conductive layer composed of a carbon paste and a metal containing conductive paste is formed thereon and then connected to a lead frame to serve as an external electrode terminal, and a resin exterior is formed with the use of an epoxy resin or the like.

Solid electrolytic capacitors using a conductive polymer as a solid electrolyte have been widely used as backup power sources for CPUs for controlling personal computers, because the solid electrolytic capacitors are capable of reducing the equivalent series resistance (ESR) and the leak current, as compared with solid electrolytic capacitors using manganese dioxide or the like as a solid electrolyte. The downsizing of personal computers has been progressed from conventional desktop computers through A4-size notebook computers to B5-size notebook computers. Furthermore, netbooks released into the market last year, which have a limited range of functions to achieve price-reduction and pursue the portability, have been receiving overwhelming support from the market.

Such reduction in size of main bodies of personal computers has been also powerfully promoting the downsizing of circuit board themselves housed in the main bodies, and as a result, there has been demand for products of capacitors which have the same capacitance, a lower profile, and a smaller area, and the demand for improvement of the ratio of capacitance developed per volume has been increased more than ever.

The capacitance of a stack-type solid electrolytic capacitor is proportional to the number of capacitor elements housed in a chip. The stacked capacitor elements are produced by a method of bonding the elements with a silver paste interposed therebetween for the purpose of integration, or a method of piling multiple sheets of cathode sections of elements and covering the cathode sections with a silver paste for the purpose of integration as disclosed in Japanese Patent Application Laid-Open No. 4-91418.

In order to increase the ratio of capacitance developed per volume in such a solid electrolytic capacitor, it is necessary to contain more elements in a specified chip volume, and the reduction in element thickness per element is thus required for stacking more sheets of capacitor elements. However, in view of the thicknesses of an anode body (aluminum foil) and a lead frame which inevitably occupy the space in the chip, the allowable thicknesses for the other components are extremely small, and it is thus becoming more and more difficult to achieve higher capacitances.

As for the thickness of a solid electrolyte layer that is a typical component other than the aluminum foil and the lead frame, a method for reducing the thickness of a solid electrolyte layer in accordance with Japanese Patent Application Laid-Open No. 2006-173593 can be given as an example, in which a step of immersion in a solution containing no oxidizing agent, followed by drying is added to a step of immersion in a solution containing a monomer and a step of immersion in a solution containing an oxidizing agent, followed by drying.

On the other hand, Japanese Patent Application Laid-Open No. 5-304059 discloses a method of joining anode foil pieces (chemically converted aluminum foil pieces) with a conductor strip interposed therebetween for the purpose of integration, then forming a solid electrolyte layer on each anode foil piece, and covering the whole with a conductive paste layer to integrate the cathode section. In addition, Japanese Patent Application Laid-Open No. 3-8313 discloses a method of stacking anode foil pieces with a polyvinyl alcohol thin film interposed therebetween and then forming a solid electrolyte layer in the gap generated by removing the polyvinyl alcohol thin film dissolved in water. In each of the methods in these patent documents, a gap is provided between anode bodies, which will be included in the thickness of a stack of capacitor elements, and a solid electrolyte or a conductive layer is formed in the gap.

SUMMARY OF THE INVENTION

Accordingly, an object of the present invention is to solve the problems of the prior art described above, and provide a solid electrolytic capacitor which has an element reduced in thickness and has a higher ratio of capacitance developed per unit volume, and a method for producing the electrolytic capacitor.

In general, individual capacitor elements stacked for building up a stack-type solid electrolytic capacitor are provided with a conductive paste layer on the outer surface of a solid electrolyte covering the capacitor element. This is because the specific resistance of a solid electrolyte is generally larger as compared with that of a highly conductive paste layer such as a silver paste layer, and the ESR is thus kept low along with a structure in which the current flowing through the capacitor passes through the solid electrolyte for a period of time as short as possible and is collected in the conductive paste layer.

However, the present inventors have found, as a result of earnest studies made by the present inventors in view of the problems, that the ESR is only slightly increased even in the case of directly piling multiple sheets of anode bodies composed of a plate-shaped valve acting metal including pores, joining adjacent anode bodies at a section thereof, and then covering the anode bodies with a solid electrolyte layer to integrate the anode bodies, although it is not known exactly why. Furthermore, the present inventors have found that when the multiple sheets of anode bodies are directly piled, and covered with a solid electrolyte layer for the integration of the anode bodies to build up a capacitor element, the need for the solid electrolyte layer and the conductive layer (such as a carbon paste layer and a silver paste layer) is eliminated, which have been provided between individual anode body elements in conventional stack-type solid electrolytic capacitors, thereby allowing the ratio of capacitance developed per volume to be increased, and have completed the present invention on the basis of these findings.

That is, the present invention relates to solid electrolytic capacitors and methods for producing the solid electrolytic capacitor as follows.

In one aspect, the present invention provides a solid electrolytic capacitor element having a solid electrolyte layer provided on a dielectric layer formed on a surface of an anode body including a valve acting metal having a pore, wherein the anode body is configured in such a way that multiple plate-shaped anode bodies are directly piled and integrated with a solid electrolyte, and adjacent piled anode bodies are joined at a section thereof.

In the solid electrolytic capacitor element, the joining is preferably carried out by welding.

In the solid electrolytic capacitor element, the anode bodies can be joined at an anode section which is not covered with the solid electrolyte.

In the solid electrolytic capacitor element, the anode bodies cab also be joined at a cathode section which is covered with the solid electrolyte.

In the solid electrolytic capacitor element, the area of a joint is preferably 1 to 30% of the area of the cathode section of the piled anode bodies.

In the solid electrolytic capacitor element, adjacent anode bodies are preferably mutually fixed at a section thereof with an insulating resin interposed therebetween.

In the solid electrolytic capacitor element, the anode body preferably has a thickness of 50 to 500 μm.

In the solid electrolytic capacitor element, the valve acting metal is preferably aluminum, tantalum, niobium, titanium, zirconium, and alloys thereof.

In the solid electrolytic capacitor element, the solid electrolyte is preferably a conductive polymer.

Another aspect of the present invention provides a method for producing a solid electrolytic capacitor element having a solid electrolyte layer provided on a dielectric layer formed on a surface of an anode body including a valve acting metal having a pore, the method including steps of: directly piling multiple sheets of anode bodies including a plate-shaped valve acting metal having a pore, and covering the anode bodies with a solid electrolyte while leaving a section of the anode bodies as it is, thereby integrating the anode bodies; and joining at least adjacent anode bodies at a section thereof.

In the method for producing a solid electrolytic capacitor element, the joining is preferably carried out by welding.

In the method for producing a solid electrolytic capacitor element, the step of covering the anode bodies with a solid electrolyte to integrate the anode bodies can be carried out before or after carrying out the step of joining the anode bodies.

In the method for producing a solid electrolytic capacitor element, a step of mutually fixing adjacent anode bodies at a section thereof with an insulating resin interposed therebetween can be included.

In the method for producing a solid electrolytic capacitor element, the step of covering the anode bodies with the solid electrolyte to integrate the anode bodies can be carried out by impregnating surfaces of directly piled anode bodies and a space between the anode bodies with a raw material solution and polymerizing the raw material solution to yield a conductive polymer.

In another aspect, the present invention provides a solid electrolytic capacitor wherein the solid electrolytic capacitor element has an anode section and a cathode section respectively connected to an anode lead terminal and a cathode lead terminal, and the entire solid electrolytic capacitor element has sealing with an insulating resin.

In the solid electrolytic capacitor, a plurality of solid electrolytic capacitor elements are preferably stacked.

In another aspect, the present invention provides a method for producing a solid electrolytic capacitor, including the steps of connecting an anode lead terminal and a cathode lead terminal respectively to an anode section and a cathode section of the solid electrolytic capacitor element, and further subjecting the entire solid electrolytic capacitor element to sealing with an insulating resin.

In yet another aspect, the present invention provides a method for producing a stack-type solid electrolytic capacitor, including the steps of stacking a plurality of the solid electrolytic capacitor elements, connecting an anode lead terminal and a cathode lead terminal respectively to an anode section and a cathode section of the stack, and further subjecting the entire solid electrolytic capacitor elements to sealing with an insulating resin.

According to the present invention, an economical solid electrolytic capacitor which has a high ratio of capacitance developed per unit volume, and a method for producing the solid electrolytic capacitor can be provided.

DETAILED DESCRIPTION OF THE INVENTION

A solid electrolytic capacitor and a method for producing the solid electric capacitor according to the present invention will be described step by step below in detail with reference to the accompanying drawings.

In the present invention, multiple anode bodies composed of a plate-shaped valve acting metal having micropores are directly piled and integrated with a solid electrolyte, and a conductive layer is stacked on the solid electrolyte to form a solid electrolytic capacitor element. The term "directly" herein used in the phrase "directly piled" means piling without interposing other layers such as a solid electrolyte layer and a conductive layer on the surface of the valve acting metal.

[Anode Body]

The valve acting metal which can be used as an anode body in the present invention is selected from aluminum, tantalum, niobium, titanium, zirconium, and alloys thereof. Preferably, the valve acting metal is aluminum or an alloy thereof. As a specific form of the valve acting metal material, a plate-shaped metal material such as foil is preferred. These valve acting metals with micropores formed at their surfaces by etching or the like in advance in accordance with a known method are preferably used.

Figure 1:
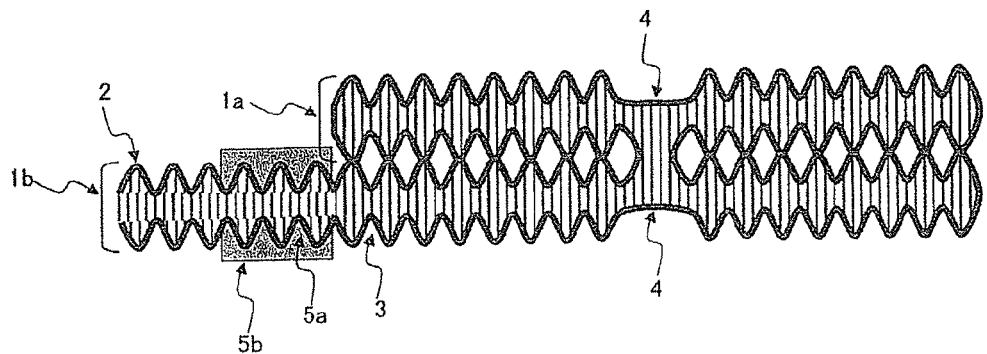
FIG. 1 is a schematic view illustrating an example of joining anode bodies and applying an insulating resin.

FIG. 1 is a schematic view illustrating a cross section in which a plate-shaped valve acting metal having micropores (hereinafter, abbreviated as a valve acting metal foil) for constituting an example of a solid electrolytic capacitor element according to the present invention is used as an anode body, and joined by welding or the like at a central joint (4) of the cathode section. Two sheets of valve acting metal foil with a dielectric film (2) formed on their surfaces are joined with each other in such a way that the shorter valve acting metal foil (1a) has a central section joined at the joint (4) with the longer valve acting metal foil (1b). In addition, FIG. 1 shows an etching layer (3) of the valve acting metal foil, an insulating resin (5a) in the etching layer, and an insulating resin layer (5b) formed on the surface of the valve acting metal foil.

While the number of anode bodies integrated with a solid electrolyte also depends on the thickness and material of the valve acting metal foil, and is thus not able to be specified categorically, it is possible to pile anode bodies one on top of another in the range of two to ten sheets.

In the present invention, the valve acting metal foil is used which has been cut into a size in line with the shape of a product. While the thickness of the foil varies depending on the intended use, foil with a thickness of about 50 to 500 μm is typically used. While the size and shape of the foil also varies depending on the application, rectangular metal foil is preferable as a plate-shaped element unit, which is about 1 to 50 mm in width and about 1 to 50 mm in length, more preferably about 2 to 20 mm in width and about 2 to 20 mm in length, even more preferably about 2 to 5 mm in width and about 2 to 6 mm in length.

In the present invention, multiple anode bodies composed of a plate-shaped valve acting metal having pores are piled one on top of another, and at least adjacent anode bodies are joined at a section thereof, that is, at least one point or multiple points of the adjacent anode bodies. The joint is preferably an anode body section covered with no solid electrolyte or insulating resin (anode section), or a section covered with a solid electrolyte for forming a cathode (cathode section), which is separated from the anode section by a separator composed of an insulating resin, in particular a central section of a section to serve as a cathode section for piled anode bodies. In addition, in the case of joining at multiple points of the valve acting metal foil, the multiple sheets of the valve acting metal foil are preferably joined in position by an equal force. In particular, in the case of joining by welding, aluminum is molten to provide an integrated joint, thus resulting in collapse of the etching layer. Therefore, the joint will lose the original surface area and lose the originally developed capacitance. Accordingly, it is more preferable to reduce the joint region.

The joint region, that is, the area of the joint is preferably 1 to 30% of the area of the cathode section of the piled valve acting metal foil, and especially preferably 5 to 20%. When the area of the joint is less than 1% of the area of the cathode section of the piled valve acting metal foil, it is difficult to stably fix adjacent anode bodies, and peeling may be caused in the process of forming the solid electrolyte. On the other hand, when the area of the joint exceeds 30%, the capacitance is decreased, and the number of piled sheets of the valve acting metal foil will thus have to be increased in order to recover the missing capacitance.

The welding for the anode bodies is preferably welding which is capable of both electrical connection and physical fixation between the sheets of the valve acting metal foil at the same time. The welding can be carried out, for example, by any one of resistance welding, laser welding, and ultrasonic welding, or by the combined use of these methods.

[Insulating Resin]

In order to separate the section covered with no solid electrolyte or insulating resin (anode section) from the section covered with a solid electrolyte for forming a cathode (cathode section), an insulating resin is applied to a boundary zone between the sections.

As the insulating resin, general heat resistant resins, preferably, heat resistant resins or precursors thereof which are soluble or swellable in a solvent, compositions composed of inorganic fine powder and a cellulose based resin, etc., can be used. However, the material of the insulating resin is not limited. Specific examples of the insulating resin include polyphenylsulphone (PPS), polyethersulphone (PES), a cyanate ester resin, fluorine resins (tetrafluoroethylene, tetrafluoroethylene-perfluoroalkyl vinyl ether copolymers, etc.), low molecular weight polyimides and derivatives thereof, and precursors thereof, and in particular, low molecular weight polyimides, polyethersulphone, fluorine resins, and precursors thereof are preferable.

Figure 2:
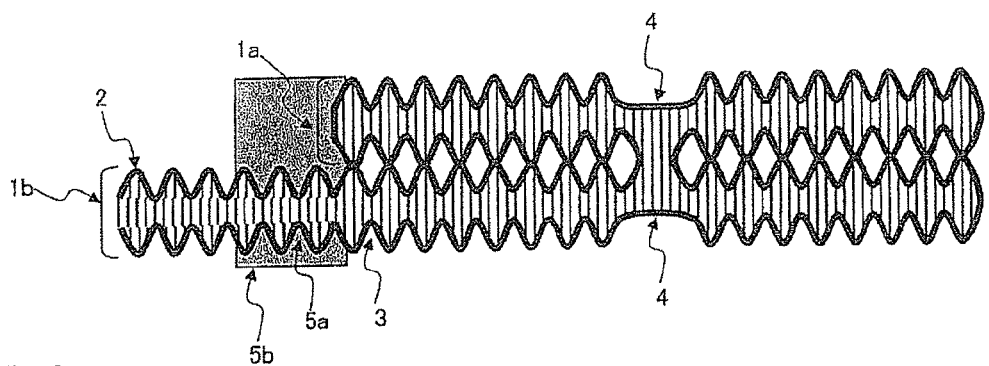
FIG. 2 is a schematic view illustrating another example of applying an insulating resin in connection with FIG. 1.
Figure 3:
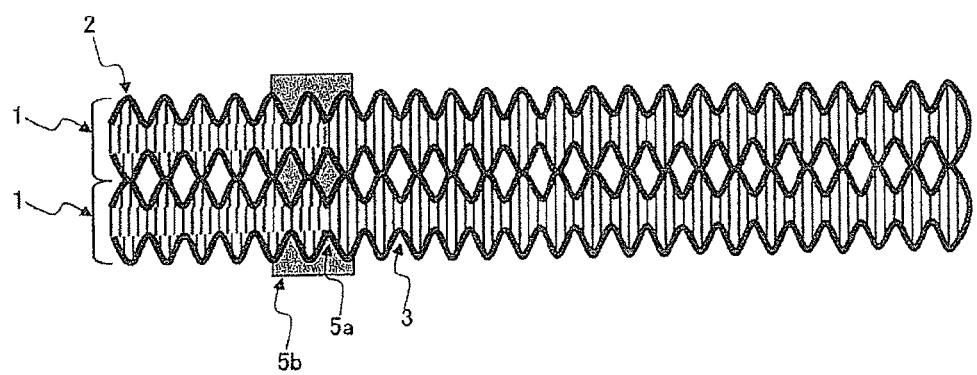
FIG. 3 is a schematic view illustrating an example of mutually fixing anode bodies with the use of an insulating resin.
Figure 4:
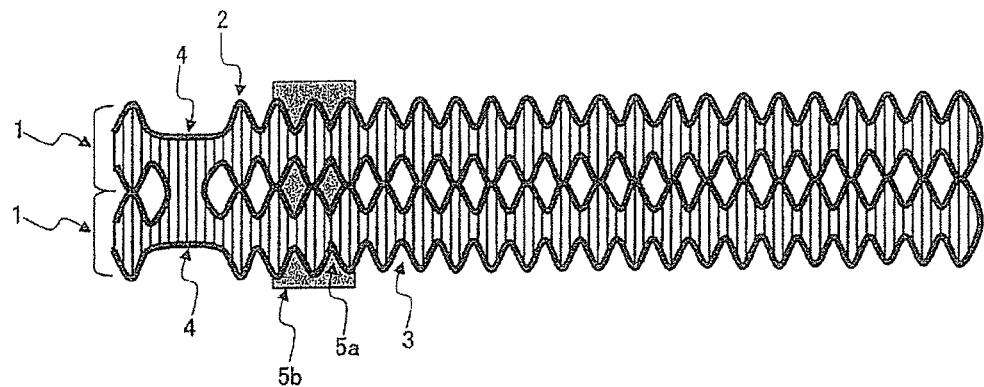
FIG. 4 is a schematic view illustrating an example of joining anode bodies at an anode section in connection with FIG. 3.

FIGS. 1 to 4 shows as examples anode bodies with an insulating resin (5) applied. In each of FIGS. 1 to 4, the left side from the insulating resin (5) serves as an anode section, whereas the right side from the insulating resin (5) serves as a cathode section. In FIG. 1, a longer valve acting metal foil (1b) has a section overlapped with no foil of the valve acting metal foil, and the insulating resin (5) is applied to the section. In FIG. 2, the insulating resin (5) shown as an example in FIG. 1 is applied to cover the tip section of a shorter valve acting metal foil (1a) and at the same time, cover a left intermediate section of the longer valve acting metal foil (1b), thereby mutually fixing the both sheets of the foil. In FIG. 3, two sheets of valve acting metal foil which have the same length have left intermediate sections covered with the insulating resin, thereby mutually fixing the both sheets of the foil. In FIG. 4, the anode sections of the two sheets of valve acting metal foil shown as an example in FIG. 3 are joined by welding.

In the present invention, adjacent anode bodies can be mutually fixed at a section thereof with an insulating resin interposed therebetween. More specifically, the fixation of the sheets of the valve acting metal foil through the application of the insulating resin can be carried out, for example, in accordance with a method of piling multiple sheets of valve acting metal foil with an insulating resin applied to a section for the separation of an anode section and a cathode section of an anode body and solidifying or curing the insulating resin by heating for the purpose of adhesive joining (for example, FIG. 3) or a method of applying an insulating resin to a section for the separation of an anode section and a cathode section of piled sheets of valve acting metal foil and then solidifying or curing the insulating resin by heating for the purpose of fixation (for example, FIG. 2).

In the case of fixation of the valve acting metal foil with the insulating resin, at least adjacent sheets of valve acting metal foil are joined at a section thereof in order to provide conduction between multiple sheets of valve acting metal foil. FIG. 4 shows a schematic view of an example of an anode body obtained by welding anode sections of two sheets of valve acting metal foil, whereas FIGS. 1 and 2 shows schematic views of examples of an anode body obtained by welding cathode sections of two sheets of valve acting metal foil.

[Dielectric Oxide Film]

If necessary, a dielectric oxide film is subsequently formed on the surface of the anode body. The method for forming the dielectric oxide film on the surface of the anode body is not particularly limited, and known methods can be used as the method. For example, in the case of using aluminum foil, anodization can be carried out in an aqueous solution containing a boric acid, a phosphoric acid, an adipic acid, or a sodium salt or an ammonium salt thereof to form an oxide film. In addition, in the case of using a sintered body of powder such as tantalum, anodization can be carried out in an aqueous phosphoric acid solution to form an oxide film on the sintered body.

The conditions for chemical conversion such as the chemical conversion solution and chemical conversion voltage for use in chemical conversion can be experimentally confirmed in advance and set to appropriate values, depending on the capacitance, withstand voltage, etc., required for a solid electrolytic capacitor to be produced. It is to be noted that the valve acting metal material is subjected to surface roughening (made more porous), then subjected to a chemical conversion treatment, comes onto the market as a chemically concerted substrate with a dielectric oxide film formed, and used for solid electric capacitors, etc. In the present invention, such commercially available valve acting metal foil subjected to a chemical conversion treatment can be also used. However, for example, in the case of joining a portion of the cathode section by welding, the dielectric layer subjected to the welding may be collapsed. In such a case, it is necessary to form a dielectric oxide film again by chemical conversion or the like.

[Solid Electrolyte]

Then, a solid electrolyte layer is formed on the cathode section by impregnating the surfaces of directly piled anode bodies and the space between the anode bodies with a raw material solution to be polymerized to yield a conductive polymer and polymerizing the raw material solution, thereby allowing for the step of covering the multiple anode bodies with the solid electrolyte to integrate the anode bodies. For the integration of multiple anode bodies, methods for fixing anode bodies, such as welding and bonding with an insulating resin, may be used in combination.

In the present invention, a conductive polymer is preferable as the solid electrolyte formed on the cathode section.

While examples of the conductive polymer include a conductive polymer including as a repeating unit a structure represented by a compound having a thiophene skeleton, a compound having a polycyclic sulfide skeleton, a compound having a pyrrole skeleton, a compound having a furan skeleton, a compound having an aniline skeleton, or the like, the conductive polymer for forming the solid electrolyte is not to be considered limited to the example.

Figure 5:
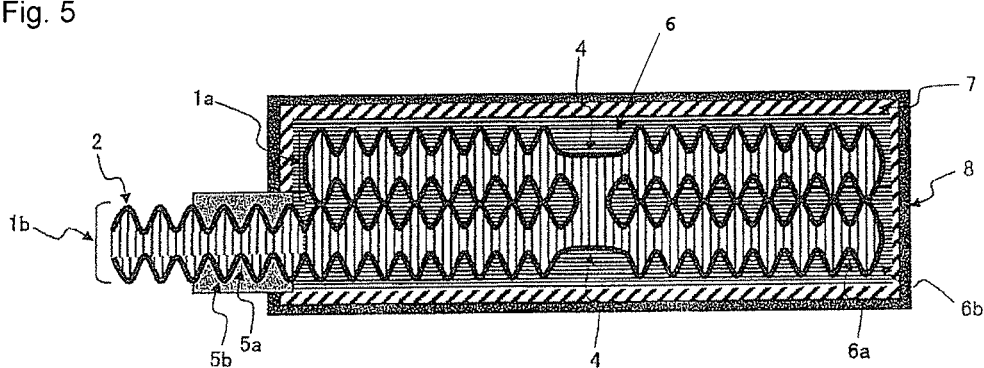
FIG. 5 is a schematic view illustrating a solid electrolytic capacitor element according to Example 1 in which anode bodies are joined at a cathode section.
Figure 6:
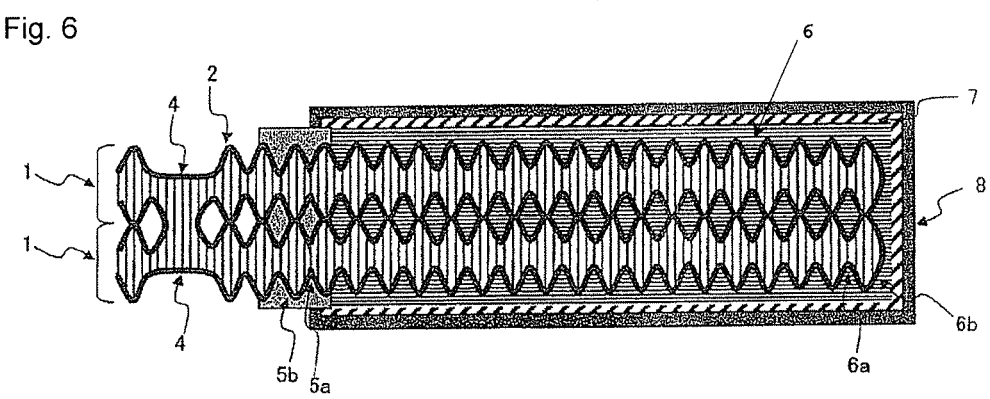
FIG. 6 is a schematic view illustrating a solid electrolytic capacitor element according to Example 2 in which anode bodies are joined at an anode section.

The solid electrolyte (6) is formed in the etching layer of the valve acting metal foil (6a) and on the surface of the valve acting metal foil (6b). In FIG. 5 or FIG. 6, the solid electrolyte is formed not only on the outer circumference of two piled sheets of valve acting metal foil, but also in the etching layer inside the piled sheets, thereby the anode bodies integrated. In addition, FIG. 5 shows a carbon paste (7) and a conductive paste (8).

According to the present invention, as described above, the step of integrating multiple anode bodies with the use of a solid electrolyte can be carried out after carrying out the step of joining the anode bodies. In addition, in the case of joining anode bodies only at the anode section, the anode bodies may be joined at the anode section after integrating the anode bodies with the use of a solid electrolyte, rather than joining (for example, FIG. 4).

While the gap between piled sheets of valve acting metal foil may be inevitably generated, structures with the gap reduced as much as possible are preferable because the capacitance per volume can be increased.

[Solid Electrolytic Capacitor]

Furthermore, a carbon paste layer and a silver paste layer are provided on the surface of the solid electrolyte layer covering the entire cathode section of the integrated anode bodies to form a cathode section for a capacitor, thereby providing a capacitor element.

A solid electrolytic capacitor according to the present invention can be obtained by connecting an anode lead terminal to the anode section of the capacitor element, connecting a cathode lead terminal to the cathode section thereof, and further subjecting the entire element to sealing with an insulating resin such as an epoxy resin.

The thus obtained capacitor element according to the present invention may be used in a stack. For example, a stack-type solid electrolytic capacitor can be formed by stacking the capacitor element on the lead terminal.

EXAMPLES

Typical examples of the present invention will be given and specifically described below. It is to be noted that these examples are given only as explanatory exemplification, and the present invention is not to be considered limited to these examples in any way.

Example 1

Production of Solid Electrolytic Capacitor of Two Anode Bodies Piled According to Embodiment in FIG. 5

Chemically converted aluminum foil (3V chemical product) with a thickness of 110 µm was cut into a foil piece with a width of 3.5 mm, and the foil piece was cut into foil pieces with a length of 13 mm. One shorter side of this foil piece was fixed to a metallic guide by welding. Subsequently, the chemically converted aluminum foil cut into the width of 3.5 mm was cut into a foil piece with a length of 4.5 mm, the foil piece was placed on the upper surface of the other chemically converted aluminum welded to the metallic guide, and a central section (cathode central section) of the chemically converted foil with the length of 4.5 mm was subjected to resistance welding while the tips unfixed to the guide were aligned and overlapped. The resistance welding was carried out with the use of a rectangular electrode of 1 mm×2 mm. It is to be noted that the area with its initial capacitance missed due to the welding accounted for 12%.

Next, a masking material (polyimide resin) for the separation of an anode section and a cathode section was applied in a linear shape with a width of 0.8 mm, mainly to a section at 5 mm from the tips of the aluminum foil pieces unfixed to the guide, and dried at 180° C. for 1 hour. Then, the section from the tips of the aluminum foil pieces unfixed to the guide to the applied polyimide resin was subjected to a chemical conversion treatment (at a current density 5 mA/cm$^2$, a chemical conversion voltage of 3.5 V, and a temperature of 65° C. in an aqueous solution of 9 mass % ammonium adipate for 10 minutes), washing with water, and drying. For a solid electrolyte to serve as a cathode layer, the cathode section (3.5 mm×4.6 mm) was immersed in an isopropanol solution containing 3,4-ethylenedioxythiophene (solution 1), and pulled up and left as it was. Next, the cathode section was immersed in an aqueous solution containing ammonium persulfate (solution 2), dried, and subjected to oxidative polymerization. The operation from the immersion into the solution 1, then through the immersion into the solution 2, to the oxidative polymerization was repeated 20 times. Next, the cathode section was washed with warm water at 50° C., and then dried at 100° C., thereby forming a solid electrolyte layer. Furthermore, an electrode was formed on the cathode section with the use of a carbon paste and a silver paste, thereby completing a capacitor element with its cross section shown in FIG. 5.

The cathode section was joined onto a lead frame with a silver paste, an anode lead terminal was joined by welding onto the section with no solid electrolyte formed, the entire element was subjected to sealing with an epoxy resin, and a voltage of 2 V was applied at 135° C. for aging, thereby producing 10 pieces in total of chip-type solid electrolytic capacitors. For these 10 capacitors, the capacitance at 120 Hz and the equivalent series resistance (ESR) at 100 kHz were measured as initial characteristics, and the average values for the capacitance and equivalent series resistance are shown in Table 1. In addition, the average thickness (element thickness) and ratio of capacitance developed (capacitance/capacitor element thickness) for the capacitor elements are shown together in Table 1.

Example 2

Production of Solid Electrolytic Capacitor of Two Anode Bodies Piled According to Embodiment in FIG. 6

Chemically converted aluminum foil (3V chemical product) with a thickness of 110 μm was cut into a foil piece with a width of 3.5 mm, and the foil piece was cut into foil pieces with a length of 13 mm. One shorter side of this foil piece was fixed to a metallic guide by welding. In order to chemically convert the cut end, a polyimide resin solution (produced by Ube Industries, Ltd.) was painted in a linear shape with a width of 0.8 mm onto a point at 7 mm from the tip unfixed to the guide, and dried at about 180° C. for 30 minutes. The section from the tip of the aluminum foil piece unfixed to the guide to the applied polyimide resin was subjected to a chemical conversion treatment in the same way as in Example 1, and subjected to washing with water and drying. Next, a polyimide resin for the separation of an anode section and a cathode section was applied in a linear shape with a width of 0.8 mm, mainly onto a section at 5 mm from the tip of the aluminum foil piece for one surface. The dryish surfaces of the chemically converted aluminum foil pieces with the polyimide resin applied thereto were subjected to pressure bonding and still standing for 30 minutes, and then drying at about 180° C. for 30 minutes. Again, the polyimide resin was painted in a linear shape with a width of 0.8 mm for one side, onto both of the outer surfaces of the piled pieces, mainly onto a section at 5 mm from the tips of the aluminum foil pieces, and dried at about 180° C. for 30 minutes. The piled foil pieces were processed in the same way as in Example 1 after the application of the polyimide resin, thereby producing a capacitor element with the two sheets of chemically converted foil piled and with its cross section shown in FIG. 6.

Subsequently, 10 pieces in total of chip-type solid electrolytic capacitors with their cross sections shown in FIG. 6 were produced in the same way as in Example 1, except that the sections of the two sheets of chemically converted aluminum foil with no solid electrolyte formed were welded onto an anode lead terminal at the same time for conductive joining, and the chip-type solid electrolytic capacitors were evaluated. The average thickness (element thickness) for the capacitor elements, the initial characteristics, and the ratio of capacitance developed per element thickness for the capacitor elements are shown in Table 1.

Example 3

Production of Solid Electrolytic Capacitor of Three Anode Bodies Piled

Chemically converted aluminum foil (3V chemical product) with a thickness of 110 μm was cut into a foil piece with a width of 3.5 mm, and the foil piece was cut into foil pieces with a length of 13 mm. One shorter side of this foil piece was fixed to a metallic guide by welding. Chemically converted aluminum foil (3V chemical product) with a thickness of 110 μm was cut into a foil piece with a width of 4.5 mm, and the foil piece was cut into foil pieces with a length of 7 mm. The foil piece with the length of 7 mm was folded at its central section, and aligned and overlapped with the tip of the chemically converted aluminum foil piece with the length of 13 mm, which was unfixed to the guide, and the central section was subjected to resistance welding for integration.

Next, a polyimide resin for the separation of an anode section and a cathode section was applied in a linear shape with a width of 0.8 mm, mainly to a section at 5 mm from the tip of the aluminum foil piece unfixed to the guide, and dried at 180° C. for 1 hour. In order to chemically convert the cut end, a polyimide resin solution (produced by Ube Industries, Ltd.) was painted in a linear shape with a width of 0.8 mm onto a point at 7 mm from the unfixed tip, and dried at about 180° C. for 30 minutes. The section from the tip of the aluminum foil piece unfixed to the guide to the applied polyimide resin was subjected to a chemical conversion treatment in the same way as in Example 1, and subjected to washing with water and drying. The foil pieces were processed in the same way as in Example 1 after the formation of a solid electrolyte onto the cathode section (3.5 mm×4.6 mm), thereby producing 10 pieces in total of chip-type capacitors, and the capacitors were evaluated. The average thickness (element thickness) for the capacitor elements, the initial characteristics, and the ratio of capacitance developed per element thickness for the capacitor elements are shown in Table 1.

Example 4

Figure 7:
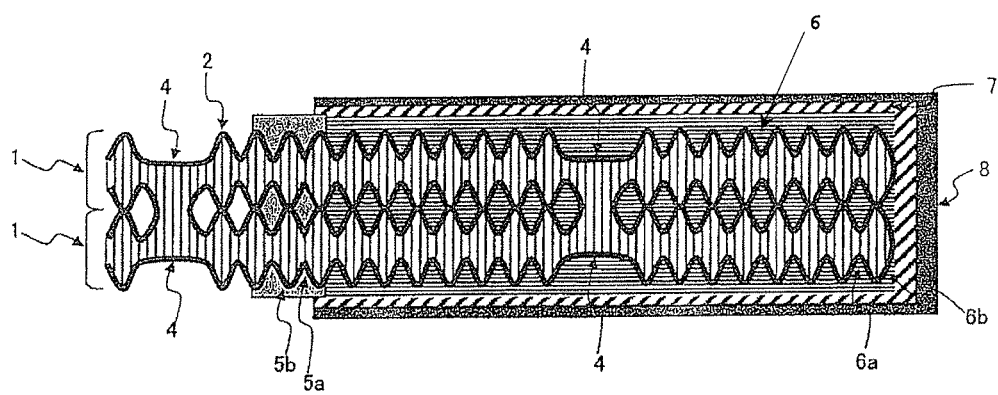
FIG. 7 is a schematic view illustrating a solid electrolytic capacitor element according to Example 4 in which anode bodies are joined at an anode section and a cathode section.

Production of Solid Electrolytic Capacitor of Two Anode Bodies Piled According to Embodiment in FIG. 7

Chemically converted aluminum foil (3V chemical product) with a thickness of 110 μm was cut into a foil piece with a width of 3.5 mm, and the foil piece was cut into foil pieces with a length of 13 mm. One shorter side of this foil piece was fixed to a metallic guide by welding. In order to chemically convert the cut end, a polyimide resin solution (produced by Ube Industries, Ltd.) was painted in a linear shape with a width of 0.8 mm onto a point at 7 mm from the tip unfixed to the guide, and dried at about 180° C. for 30 minutes. The section from the tip of the aluminum foil piece unfixed to the guide to the applied polyimide resin was subjected to a chemical conversion treatment in the same way as in Example 1, and subjected to washing with water and drying. Next, a polyimide resin for the separation of an anode section and a cathode section was applied in a linear shape with a width of 0.8 mm, mainly onto a section at 5 mm from the tip of the aluminum foil piece for one surface. The dryish surfaces of the chemically converted aluminum foil pieces with the polyimide resin applied thereto were subjected to pressure bonding and still standing for 30 minutes, and then drying at about 180° C. for 30 minutes. Again, the polyimide resin was painted in a linear shape with a width of 0.8 mm for one side, onto both of the outer surfaces of the piled pieces, mainly onto a section at 5 mm from the tips of the aluminum foil pieces, and dried at about 180° C. for 30 minutes. Furthermore, a central section of the cathode was subjected to resistance welding with the use of a rectangular electrode of 1 mm×2 mm. The piled foil pieces were processed in the same way as in Example 1 after the application of the polyimide resin, thereby producing a capacitor element with its cross section shown in FIG. 7.

Subsequently, 10 pieces in total of chip-type solid electrolytic capacitors were produced in the same way as in Example 1, except that the sections of the two sheets of chemically converted aluminum foil with no solid electrolyte formed were welded onto an anode lead terminal at the same time for conductive joining, and the chip-type solid electrolytic capacitors were evaluated. The average thickness (element thickness) for the capacitor elements, the initial characteristics, and the ratio of capacitance developed per element thickness for the capacitor elements are shown in Table 1.

Comparative Example 1

Chemically converted aluminum foil (3V chemical product) with a thickness of 110 μm was cut into a foil piece with a width of 3.5 mm, and the foil piece was cut into foil pieces with a length of 13 mm. One shorter side of this foil piece was fixed to a metallic guide by welding. In order to chemically convert the cut end, a polyimide resin solution (produced by Ube Industries, Ltd.) was painted in a linear shape with a width of 0.8 mm onto a point at 7 mm from the tip unfixed to the guide, and dried at about 180° C. for 30 minutes. The section from the tip of the aluminum foil piece unfixed to the guide to the applied polyimide resin was subjected to a chemical conversion treatment, and subjected to washing with water and drying. Next, a polyimide resin for the separation of an anode section and a cathode section was applied in a linear shape with a width of 0.8 mm, mainly onto a section at 5 mm from the tip of the aluminum foil piece, and dried at 180° C. for 1 hour. The foil piece was processed in the same way as in Example 1 after the formation of a solid electrolyte onto the cathode section (3.5 mm×4.6 mm), thereby producing 10 pieces in total of chip-type capacitors, and the capacitors were evaluated. The average thickness (element thickness) for the capacitor elements, the initial characteristics, and the ratio of capacitance developed per element thickness for the capacitor elements are shown in Table 1.

TABLE 1

| Example Item | Element Characteristics Element Thickness (μm) | Initial Characteristics | | Ratio of Capacitance Developed Capacitance/Element Thickness (μF/μm) |
|---|---|---|---|---|
| | | Capacitance (μF) | ESR (mΩ) | |
| Example 1 | 263 | 79 | 19.8 | 0.30 |
| Example 2 | 279 | 90 | 15.4 | 0.32 |
| Example 3 | 373 | 117 | 18.1 | 0.32 |
| Example 4 | 275 | 88 | 13.6 | 0.32 |
| Comparative Example 1 | 196 | 48 | 18.3 | 0.24 |

As shown in Table 1, the capacitor elements (Examples 1 to 4) according to the present invention has ESR hardly degraded and allows the ratio of capacitance developed per element thickness to be increased, as compared with the conventional element (Comparative Example 1).

The present invention is intended to provide an economical solid electrolytic capacitor element which has a high ratio of capacitance developed per unit volume, and a method for producing the electrolytic capacitor element. The solid electrolytic capacitor element according to the present invention allows for the production of a solid electrolytic capacitor which has the same capacitance, a lower profile, and a smaller area.

What is claimed is:

1. A method for producing a solid electrolytic capacitor element, the method comprising:
   directly piling multiple sheets of anode bodies including a plate-shaped valve acting metal having a pore;
   covering the anode bodies with a solid electrolyte while leaving a section of the anode bodies uncovered so as to integrate the anode bodies; and
   mutually fixing adjacent anode bodies at a section thereof with an insulating resin interposed therebetween.

2. The method for producing a solid electrolytic capacitor element according to claim 1, wherein the joining is carried out by welding.

3. The method for producing a solid electrolytic capacitor element according to claim 1, wherein the step of covering the anode bodies with a solid electrolyte to integrate the anode bodies is carried out after the joining of the anode bodies.

4. The method for producing a solid electrolytic capacitor element according to claim 1, wherein the step of joining the anode bodies is carried out after the covering of the anode bodies with the solid electrolyte while leaving the section of the anode bodies uncovered so as to integrate the anode bodies.

5. The method for producing a solid electrolytic capacitor element according to claim 1, wherein the step of covering the anode bodies with the solid electrolyte to integrate the anode bodies is carried out by impregnating surfaces of directly piled anode bodies and a space between the anode bodies with a raw material solution and polymerizing the raw material solution to yield a conductive polymer.

* * * * *